United States Patent [19]

Woodruff et al.

[11] Patent Number: 4,485,427
[45] Date of Patent: Nov. 27, 1984

[54] FOLD-BACK POWER SUPPLY

[75] Inventors: Frederick W. Woodruff; Daniel C. Hughey, both of Indianapolis, Ind.

[73] Assignee: Ransburg Corporation, Indianapolis, Ind.

[21] Appl. No.: 369,365

[22] Filed: Apr. 19, 1982

[51] Int. Cl.³ .............................................. H02H 3/08
[52] U.S. Cl. ..................................... 361/235; 323/278
[58] Field of Search ................. 361/235, 79; 323/278, 323/276, 277

[56] References Cited

U.S. PATENT DOCUMENTS

3,345,554 10/1967 Lupoli ................................. 323/278
3,753,079 8/1973 Trilling .............................. 323/278
3,801,894 4/1974 Spiegel ........................... 361/235 X
4,180,768 12/1979 Ferraro ............................. 361/79 X
4,187,527 2/1980 Bentley ............................. 361/235

Primary Examiner—Reinhard J. Eisenzopf
Attorney, Agent, or Firm—Barnes & Thornburg

[57] ABSTRACT

An electrostatic charging potential generator for a coating dispenser is useful with, for example, hand-held dispensers where the dispenser can be brought into closely spaced orientation with articles to be coated, or "targets." The generator of the disclosure incorporates a "fold-back" voltage-current characteristic including a reduced voltage-reduced current curve region in which the energy available at the dispenser is less than that necessary for spark ignition of solvents, atomized coating material particles, and the like suspended in the atmosphere around the dispenser.

16 Claims, 6 Drawing Figures

FOLD-BACK POWER SUPPLY

This invention relates to a control circuit, and more particularly, to a control circuit for an electrostatic coating apparatus for preventing disruptive electrical discharge. Typically, articles, or "targets," to be coated and the electrostatic coating dispensing apparatus for coating the targets are moved relatively toward and away from each other, e.g., by conveying the targets past the coating-dispensing apparatus on a conveyor. The targets and dispenser are subject to relative motion not only past each other, but also oscillatory relative motion, e.g., swinging motion, toward and away from each other.

In industrial electrostatic coating systems, high voltage direct current power supplies are used which produce, across a pair of terminals, potentials having high magnitudes, for example, 60 kilovolts (KV) DC. Typically, one of the terminals is at ground or approximately ground potential, while the other terminal is held at a high magnitude (frequently negative) potential. This last, or high potential, terminal is generally connected to a charging device which charges particles of the coating material. The atomized and charged material moves through the electric field between the charging device and the target in the direction of the target, strikes the target, and sticks to it. Generally, the target is maintained at a low magnitude potential, e.g., approximately ground, just as is the low potential terminal of the high voltage supply. However, it is to be understood that sometimes the target is held at the high magnitude potential and the dispensing device is maintained at ground or essentially ground potential. Although the system described herein operates with the dispenser at high magnitude potential, it is to be understood that the system will function equally well with the dispenser at essentially ground and the targets at high magnitude potential.

In a typical automatic or manual electrostatic coating installation, targets are frequently carried toward and away from the dispensing device or the dispensing device is freely movable toward and away from the targets. Thus, considerable relative motion between the dispensing device and targets is possible. As the spacing between target and dispensing device decreases, the potential gradient between the dispensing device, which is typically at a high magnitude potential, and the target, which is typically at approximately ground potential, can increase to quite high values unless steps are taken to limit the gradient. The discharge current betwen the dispensing device and the target varies as the potential gradient between the target and the dispensing device varies, the current increasing as the spacing between the target and dispensing device decreases toward a minimum, and decreasing as the spacing between the target and the dispensing device increases to a maximum. Appreciation of these characteristics of such electrostatic coating apparatus has been amply demonstrated by, for example, U.S. Pat. Nos. 3,851,618; 3,875,892; 3,894,272; 4,000,443; 4,075,677; and 4,187,527, and British patent specification Nos. 1,454,395; 1,511,304; 720,418; and 801,619.

As can be appreciated, a considerable hazard presented by the relative movement of targets and the dispensing device across which such high potential differences exist is the possibility of spark discharge across the space between the dispensing device and the targets. The desirability of a system which minimizes the likelihood of such spark discharge is apparent. Operators of electrostatic coating apparatus occasionally occupy work stations quite close to the dispensing device, the targets, or both. This is particularly true for the so-called "manual," or hand-held and hand-operated, dispensing devices. Additionally, certain materials used in the coating process, or in operations related to the coating process, are volatile. Thus, the vapors of such materials may be present in the atmosphere near the dispensing device. Further, fine particles of the coating material itself are frequently suspended in the atmosphere surrounding the dispensing device. Many such materials are flammable. Additionally, of course, such spark discharges can be detrimental to parts of the electrostatic coating apparatus itself, e.g., the high voltage supply.

The safety hazard presented by the possibility of a spark discharge between the dispensing device and the target illustrates the desirability of a system which can react favorably to the presence of conditions conducive to spark discharge.

Some of the aforementioned patents discuss systems which predict the existence of conditions which favor high voltage arcing. The apparatus disclosed in some of the above-mentioned patents acts on such a prediction to reduce the potential on the dispensing device to a low level, e.g., approximatley ground, to prevent arcing.

According to the invention, a power supply for a coating material dispensing device includes means for generating electrostatic charging potential and means for monitoring a current flow in the potential generator, illustratively either the current flowing from the generator to the dispensing device or a return current from the dispensing device to the potential generator. Means are also provided for monitoring and controlling the electrostatic potential so that the potential-current relationship varies generally along an increasing current-decreasing potential curve through a first region of the plot of potential-current relationship, and the potential-current relationship varies generally along a decreasing current-decreasing potential curve through a second region of the plot.

More specifically, a power supply for a coating material dispensing device includes, in addition to the electrostatic potential generator, the current monitor and means for coupling the current monitor to the potential generator, means for monitoring the electrostatic potential, means for coupling the potential monitor to the potential generator, a comparator, means for coupling the potential monitor to an input of the comparator, means for coupling the current monitor to an input of the comparator, and means for coupling an output of the comparator to a control input of the electrostatic potential generator.

In illustrative embodiments of the power supply, the means for monitoring the potential supplied to the dispensing device comprises, in one instance, means for monitoring a potential supplied to the electrostatic potential generator, or, in another instance, the potential supplied by the electrostatic potential generator.

Further, illustratively, the means for coupling the electrostatic potential monitor to an input of the comparator includes a filter for filtering from the monitored potential signal those frequencies above a desired cutoff frequency.

Additionally, according to illustrative embodiments, the means for coupling the current monitor to an input of the comparator includes a filter for filtering from the monitored current signal those frequencies above a desired cutoff frequency.

The invention may best be understood by referring to the following description and accompanying drawings which illustrate the invention. In the drawings.

Figure 1:
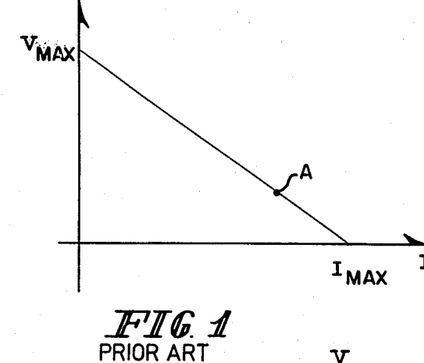
FIG. 1 illustrates an output potential-current characteristic of one type of known prior art apparatus.

Turning now to FIG. 1, an output high magnitude potential-output current characteristic of a system of the type illustrated in, for example, British patent specification No. 720418, illustrates that as high potential rectifier and multiplier output current (or ground return current) increases, output high potential decreases in a fairly linear manner. At a point, illustrated in FIG. 1 as point A, the output high potential may, under certain circumstances of dispensing device-target spacing and material suspended in the atmosphere in the dispensing device-target space, be of sufficient magnitude to permit a spark having enough energy to ignite the material suspended in the space.

Figure 2:
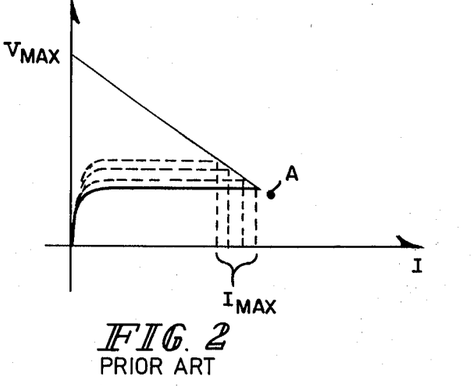
FIG. 2 illustrates an output potential-current characteristic of another known type of prior art apparatus.

FIG. 2 illustrates an output high potential-output current (or ground return current) characteristic of systems such as that illustrated in, for example, U.S. Pat. No. 4,187,527. In this characteristic, when the output high potential-current curve reaches a particular point somewhat less than the ignition point A from FIG. 1, the output potential is shorted to ground or essentially ground. In systems of this type, the point at which this switching to ground occurs can vary somewhat along the output high potential-output current curve, as indicated by the number of broken lines, by virtue of the manner in which the system itself functions. However, under all of these circumstances, the intent is to maintain the point at which the system shorts the output high potential to ground safely at a potential less that the ignition point A.

A problem associated with such systems is that they require rather expensive and cumbersome switches to handle the necessary extremely rapid switching of the high potential output from whatever potential appears across it just prior to switching (illustratively as much as ±140 KVDC) to essentially zero or ground potential after switching. The switches of such systems may be required to switch in a matter of a few milliseconds after the system predicts an impending spark to reduce to the greatest possible extent the likelihood of such a spark after the prediction of the impending spark has been made.

Figure 3:
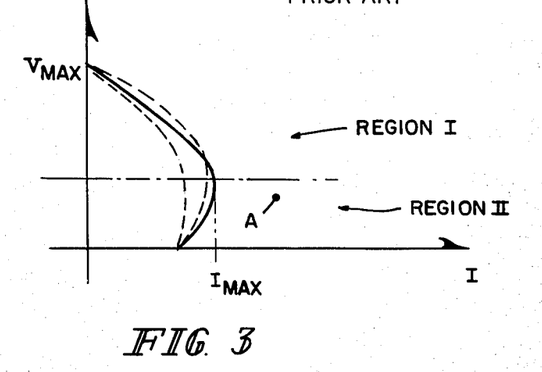
FIG. 3 illustrates an output potential-current characteristic of an apparatus constructed according to the present invention.

As best illustrated in FIG. 3, the output high potential-output current (or return current) characteristic which the systems of the present invention seek to provide is a so-called "fold-back" characteristic. That is, the characteristic is one in which the output high potential-output (or return) current varies generally linearly along an increasing current-decreasing potential curve throughout a first region of the potential-current characteristic, and the potential and current both vary substantially continuously along a decreasing current-decreasing potential curve throughout a second region of the potential-current characteristic. In FIG. 3, the first region is indicated by the reference numeral I, and the second region is indicated by the reference numeral II. Although specific slopes for the potential-current characteristic in regions I and II are illustrated, it is to be understood that these characteristics can vary, depending upon the load through which the high potential supply operates, and other factors such as system gains and the like. This point is illustrated by the accompanying broken-line curves to the solid-line curve illustrated in FIG. 3. It is to be noted, however, that in all of these curves, the region of transition from region I to region II, the so-called "knee" of the fold-back curve, keeps the potential-current characteristic well below the ignition point A. In addition, there is no high potential switching taking place, since the regulation is fairly smooth and the transition from region I to region II is substantially continuous.

Figure 4:
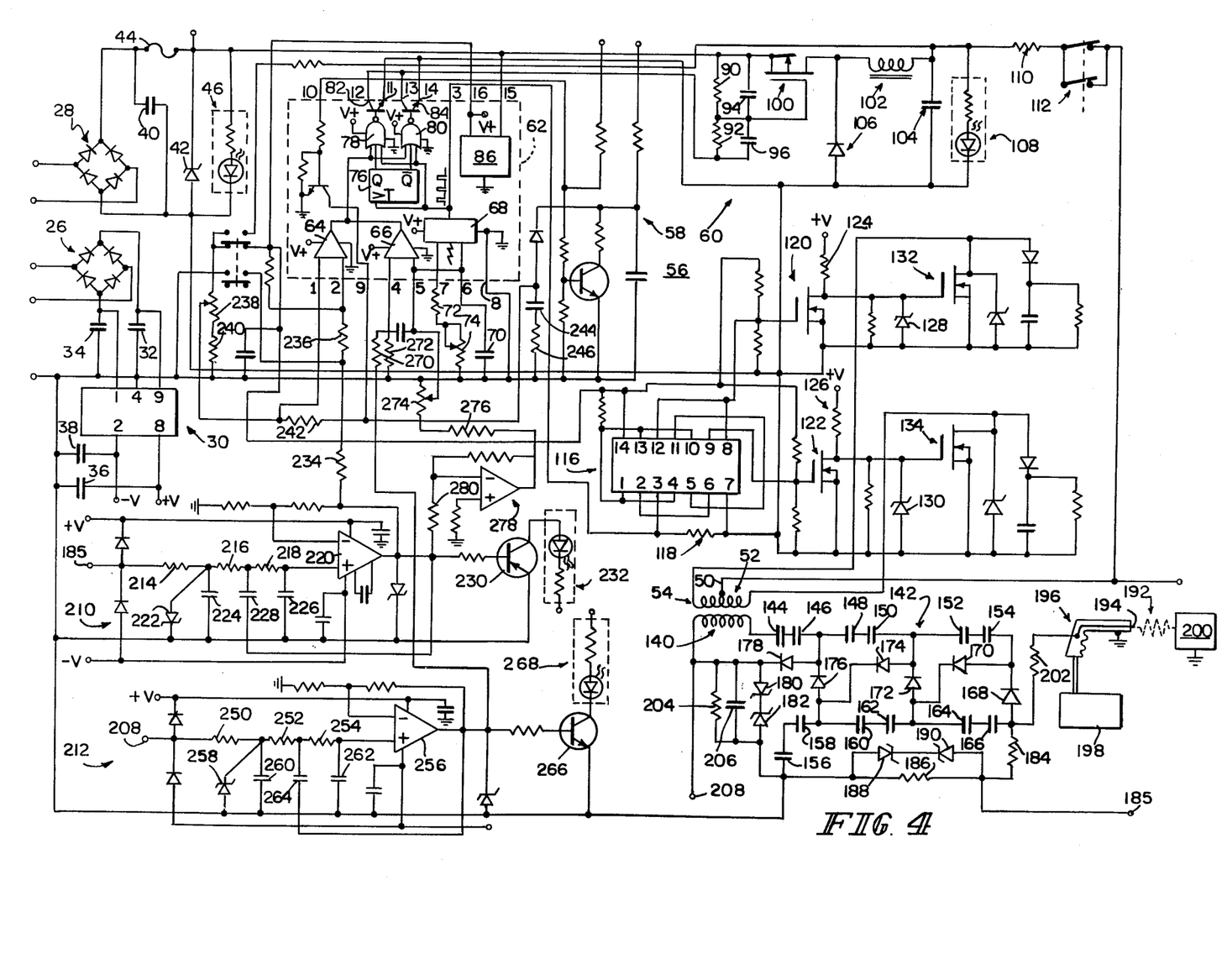
FIG. 4 illustrates a system constructed according to the present invention.

A system for achieving the high magnitude output potential-output (or return) current is illustrated in FIG. 4. In FIG. 4, low and intermediate potentials are supplied from full-wave rectifiers 26, 28, respectively. The low potential from rectifier 26 is provided to terminals 9 (positive), 1 (negative) of an integrated circuit 30 such as the NE5554U voltage regulator available from Signetics Corporation, Sunnyvale, Calif. 94086. The output voltages from regulator 30 provided at terminals 8 (positive), 2 (negative) thereof illustratively are +15 VDC and −15 VDC. The input and output potentials to and from terminals 9, 1, 8, 2 are filtered and stored by capacitors 32, 34, 36, 38, respectively. A system ground is established at terminal 4 of circuit 30.

The output terminals of full-wave bridge rectifier 28 are coupled together through a capacitor 40. A Zener diode 42 clamps the maximum potential across capacitor 40, across which Zener diode 42 is coupled through a protective fuse 44. The presence of the intermediate potential, illustratively +28 VDC (unregulated) across capacitor 40 is indicated by the series resistor-LED 46. This +28 VDC (unregulated) potential is regulated for feeding to the center tap 50 of the primary winding 52 of a high potential transformer 54 through a series regulator 56 including a pulse width modulating regulator driver stage 58 and a regulator output stage 60. The regulator driver stage 58 employs an integrated circuit 62 such as the SG3524 integrated circuit available from Signetics Corporation. Although this circuit is essentially of conventional configuration, the components contained within the integrated circuit 62 are illustrated in block diagram form for a better understanding of the operation of the system. The pin numbers 1–16 appearing within the integrated circuit block 62 correspond to the pin numbers of the SG3524 integrated circuit. Integrated circuit 62 includes an error amplifier 64 with an inverting input terminal 1 and a non-inverting input terminal 2. Regulator driver circuit 62 also includes a current-limit sensing amplifier 66 including a non-inverting current-limit sense terminal 4 and an inverting current-limit sense terminal 5. Circuit 62 further includes an oscillator or clock 68, one input terminal (6) of which is coupled to a time constant determining capacitor 70 external to circuit 62, another terminal (7) of which is coupled to a time constant determining series resistor 72-potentiometer 74 combination, also external to circuit 62. Terminal 8 of integrated circuit 62, the circuit 62 ground, is coupled to the integrated circuit 30 ground. The input (repetitive ramp) and output (rectangular pulse) waveforms of clock 68 are illustrated. Illustratively, the output frequency of the clock 68 is 40 KHz. The clock 68 output is supplied directly to pin 3 of integrated circuit 62, and is also supplied to the >T input of a flip-flop 76 on circuit 62. The output terminals Q and Q̄ of flip-flop 76 are coupled to input terminals of respective NOR gates 78, 80. The output of clock 68 is also coupled to input terminals of both of gates 78, 80. The output terminals of both error amplifer 64 and current-limit sense amplifier 66 are joined and are coupled to the remaining terminals of both of gates 78, 80. The output terminals of NOR gates 78, 80 are coupled to the bases of respective output transistors 82, 84 on circuit 62. The emitters of transistors 82, 84 are formed at terminals 11, 14 of circuit 62, and are coupled together externally of circuit 62. The collectors of transistors 82, 84 are formed at terminals 12, 13, and are coupled together externally of circuit 62. An on-board low-potential supply is provided at 86. The input terminal of supply 86, terminal 15 of circuit 62, receives potential from bridge rectifier 28 and supplies at its output terminal (terminal 16 of circuit 62) regulated low potential, e.g., +5 VDC, to drive the on-board circuits 62 and for use externally.

The output stage 60 of the series regulator 56 includes a voltage divider network including series resistors 90, 92 coupled in parallel with respective series capacitors 94, 96 between the unregulated input conductor from bridge rectifier 28 and the joined collectors of output transistors 82, 84. Integrated circuit 62, with its output transistors 82, 84 functions as a regulating pulse width modulator, the variable width output of which drives the voltage divider network 90, 92, 94, 96. A divided output potential from this network is supplied to the gate electrode of a P-channel power FET 100. FET 100 illustratively is an IRF 9530 power FET, manufactured by International Rectifier Corporation, El Segundo, Calif. 90245. The source electrode of FET 100 is coupled to the unregulated +28 VDC conductor from bridge rectifier 28, and the drain electrode of FET 100 is coupled through a choke 102 and a capacitor 104 to pins 11, 14 of circuit 62. A flyback diode 106 is coupled across the filter formed by choke 102 and capacitor 104. The presence of regulated +28 VDC across capacitor 104 is indicated by the series resistor-LED combination 108. The regulated +28 VDC is provided through a current viewing resistor 110 and switch contacts 112.

The clock output at terminal 3 of circuit 62 is supplied to an input terminal, pin 3, of a dividing and wave-shaping integrated circuit 116. Circuit 116 illustratively is a type 74LS74 integrated circuit available from National Semiconductor Corporation, Santa Clara, Calif. 95051. Pin 3 is coupled to the ground established at pin 7 through a resistor 118. The circuit 116, when coupled in the illustrated configuration, serves to divide this clock-frequency input at pin 3 by four and to produce at outputs, pins 8 and 9, two complementary square-wave drive signals at the gate electrodes of two power FET drivers 120, 122. FET drivers 120, 122 both illustratively are N-channel field effect transistors such as the 2N6661 available from Siliconix, Incorporated, of Santa Clara, Calif. 95054. The sources of both of field effect transistors 120, 122 are coupled back to the joined emitters 11, 14 of circuit 62. The drains of both of FETs 120, 122 are coupled through respective resistors 124, 126 to suitable DC potentials. The drains of FETs 120, 122 are also coupled through respective voltage-regulating Zener diodes 128, 130 to their respective source electrodes, and to the gate electrodes of respective output N-channel power FETs 132, 134. FETs 132, 134 illustratively may be type IRF 520 FETs available from International Rectifier Corporation. Again, the sources of FETs 132, 134 are coupled to emitters 11, 14 of the output transistors on circuit 62. The drains of output FETs 132, 134 are coupled to the opposite ends of the primary 52 of transformer 54.

The circuitry thus described serves to provide a regulated feed potential at the center tap 50 of primary winding 52, and 10 KHz complementary switching signals at the opposite ends of the primary winding 52. The voltage variations appearing across the center tap-to-end of winding 52 cause much higher potential variations across the step-up secondary winding 140 of transformer 54. The output signal from winding 140 is the input signal to a high potential rectifier and multiplier 142 of the Cockcroft-Walton type. The rectifier and multiplier 142 includes series capacitors 144, 146, 148, 150, 152, 154 in one leg. Series capacitors 156, 158, 160, 162, 164, 166 are placed in the other leg. Rectifiers 168, 170, 172, 174, 176, 178 complete the rectifier 142 network. The anode of diode 168 forms the output terminal of the high voltage rectifier and multiplier 142. The cathode of diode 178 is coupled to the low magnitude potential terminal of secondary winding 140.

An extremely high resistance voltage divider including resistors 184, 186 is coupled between the anode of diode 168 and the anode of Zener diode 182. A back-to-back Zener diode protective circuit including Zener diodes 188, 190 is coupled in parallel with resistor 186. Illustratively, the resistance of resistor 184 is about $10^9$ ohms and the resistance of resistor 186 is about $10^5$ ohms. When the potential on the anode of Zener diode 168 is −60 KV, the potential difference across resistor 186 might be on the order of 6 volts. This potential appears across a terminal 185 and the anode of Zener diode 182 (ground). Of course, this voltage varies somewhat depending upon the magnitude of the input feed voltage at center tap 50 and the load resistance (illustrated diagrammatically by the broken-line resistor 192 between the charging electrode 194 of a dispensing device 196 for coating material from a source 198 onto a grounded target 200). Resistance 192 varies, for example, based upon the spacing between electrode 194 and target 200. There is also some resistance 202 in the cable coupling the rectifier and multiplier 142 to the dispensing device 196. The high magnitude potential-related signal at the anode of Zener diode 190 will be slightly negative with respect to the potential at the anode of Zener diode 188 (ground). The current returning from ground to the low magnitude potential terminal of secondary winding 140 must flow through resistor 204, creating a slight potential across Zener diodes 180 and 182, positive with respect to ground. Capacitor 206 coupled in parallel with resistor 204 serves to stabilize this potential. The potential appearing across the circuit including resistor 204, capacitor 206, and Zener diodes 180, 182 is directly proportional to the current flowing from the anode of diode 168 through the cable resistance 202, the electrode 194, the variable load resistance 192, and the target 200 to ground and back through the circuit 204, 206, 182, 180 to the anode of diode 182.

Two essentially identical active filters 210, 212 of the general type described in U.S. Pat. Nos. 4,075,677 and 4,187,527 are provided. The input signal to filter 210 is the high magnitude potential-related signal at terminal 185. The input signal to filter 212 is the return current-related signal at terminal 208. Each of filters 210, 212 is a three-pole Butterworth active filter. Filter 210 includes a series resistor string 214, 216, 218 between terminal 185 and the non-inverting input terminal (+) of an operational amplifier 220. A protective Zener diode 222 is coupled between the junction of resistors 214, 216 and the voltage source 30 ground. A capacitor 224 is coupled in parallel with diode 222. A capacitor 226 is coupled between the input terminal of amplifier 220 and this ground. A feedback capacitor 228 is coupled between the junction of resistors 216, 218 and the output terminal of amplifier 220. The presence of signal at the output terminal of amplifier 220 drives a transistor 230 to produce a visible indication of signal on the series LED-resistor combination 232.

Filter 210 filters all components of the high voltage present at the anode of diode 168 above a desired frequency from the signal on terminal 185 and provides at the output of amplifier 220 a high potential-related signal without these high frequency components. Illustratively, the cut-off frequency of filter 210 is 10 Hz. This signal is supplied through resistors 234, 236 to pin 2 of circuit 62, the non-inverting input terminal of the error amplifier 64 in that circuit. This signal is provided for comparison to the "desired output high voltage" signal established at pin 1 of circuit 62, the inverting input terminal of error amplifier 64. The "desired output high voltage" signal is established through the voltage at pin 16 and the network including potentiometer 238, resistor 240, resistor 242, capacitor 244, and resistor 246.

Filter 212 includes series resistors 250, 252, 254 between terminal 208 and the non-inverting (+) input terminal of an amplifier 256. A protective Zener diode 258 is coupled between the junction of resistors 250, 252 and the circuit 30 ground. A capacitor 260 is coupled in parallel with Zener diode 258. A capacitor 262 is coupled between the + terminal of amplifier 256 and this ground. The output of amplifier 256 is coupled back to the junction of resistor 252, 254 through a feedback capacitor 264. A visual indication of the presence of signal at the output terminal of amplifier 256 is provided by a transistor 266 and a series LED-resistor combination 268. The signal at the output terminal of amplifier 256 is the return current-related signal at terminal 208, without the components above a selected cut-off frequency. Illustratively, the cut-off frequency again is 10 Hz.

The low frequency current-related signal at the output of amplifier 256 is coupled through a resistive voltage divider 270, 272 to circuit 62 ground. The junction of resistors 270, 272 is coupled to the non-inverting (+) current limit sense input terminal, pin 4, of circuit 62. The inverting (−) input terminal of current limit comparator 66 is coupled to the wiper of a potentiometer 274 which is coupled in series with a resistor 276 between the output terminal of an inverting amplifier 278 and circuit 30 ground. Amplifier 278 inverts the output signal from amplifier 220, to which the inverting (−) input terminal of amplifier 278 is coupled through a resistor 280. In this manner, the return current signal is compared to an output voltage-related signal. As the return current approaches a threshold value established by the setting of potentiometer 274, the output pulse width from transistors 82, 84 begins to narrow, reducing the potential at the center tap 50 of transformer 54 of primary winding 52. This results in a decreasing potential at the anode of diode 168, thereby forming the "knee" of the "fold-back" characteristic illustrated in FIG. 3.

Figure 5:
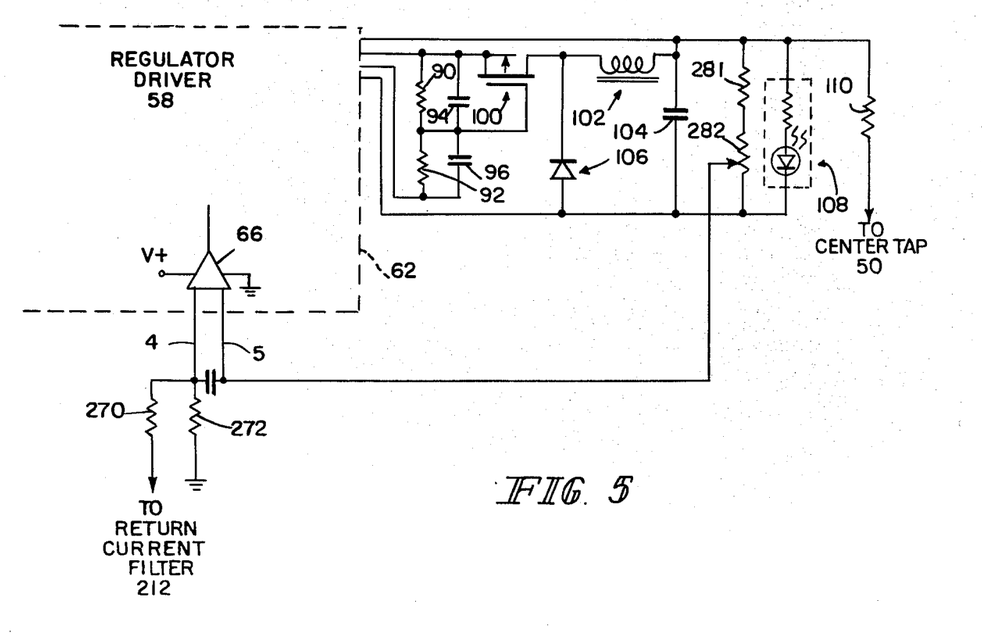
FIG. 5 illustrates a detail of a modification of the system illustrated in FIG. 4.

It will be appreciated that if pin 5 of current limit sense comparator 66 in circuit 62 were coupled to a fixed reference potential, rather than the high potential variable voltage established on the wiper of potentiometer 274, the pulse width of the signal at the output transistors 82, 84 would be reduced an amount necessary to maintain the return current filter 212 output voltage (on the output terminal of amplifier 256) substantially constant. However, since pin 5 of amplifier 66 in circuit 62 is coupled to a voltage which is variable with the high potential appearing on the anode of diode 168, and this voltage is being reduced automatically by the action of filter 210 and error amplifier 64, the "fold-back" characteristic of FIG. 3 results. Therefore, it will be appreciated that tying the − current sense terminal (pin 5) of comparator 66 in circuit 62 to any voltage which varies directly with the output high voltage will provide this fold-back characteristic. To that end, in the modification of the FIG. 4 circuit illustrated in FIG. 5, series resistor 281 and potentiometer 282 are coupled in parallel with capacitor 104 in the series regulator output stage 60. The potential on the wiper of the potentiometer 282 is coupled to pin 5, the − current limit sense input to comparator 66 in circuit 62. In this circuit, of course, resistor 276 and potentiometer 274 between high voltage filter 210 and pin 5 of circuit 62 are deleted.

Figure 6:
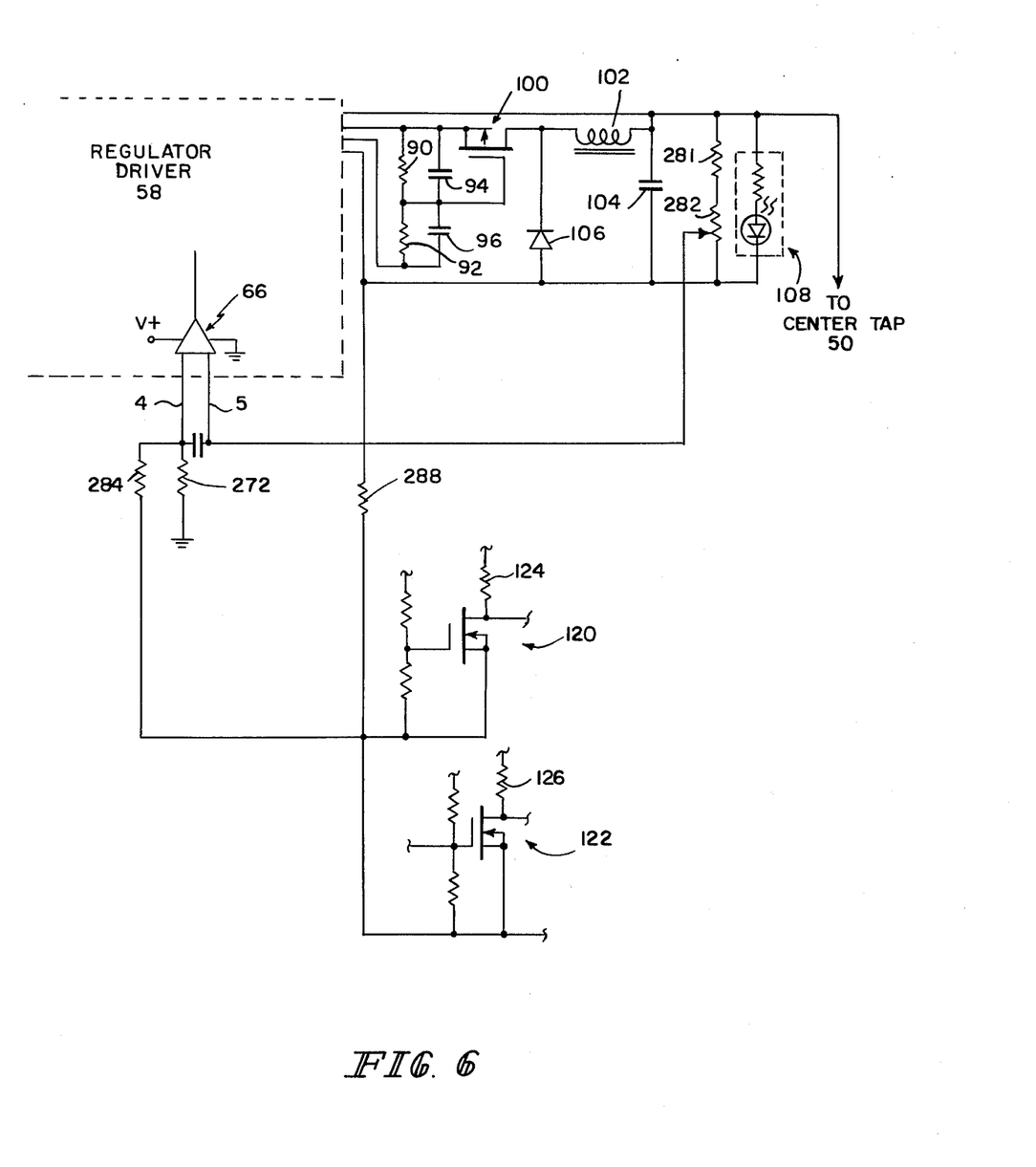
FIG. 6 illustrates another system constructed according to the present invention.

In another modification of the FIG. 4 circuit illustrated in FIG. 6, series resistor 281 and potentiometer 282 are coupled in parallel with capacitor 104 in the series regulator output stage 60. The potential on the wiper of the potentiometer 282 is coupled to pin 5, the − current limit sense input to comparator 66 in circuit 62.

In this circuit, a resistor 288 is coupled in series in the center tap return line to the center tap regulator circuit 60 common point, the anode of diode 106. Resistor 288 is coupled in series between the common sources of FETs 120, 122 and the anode of diode 106. The common sources of FETs 120, 122 are then coupled through a resistor 284 to pin 4, the + current limit sense input to comparator 66. The signal developed across resistor 288 is directly proportional to the current flow from center tap 50 (FIG. 4). In the embodiment of FIG. 6, resistor 288 takes the place of resistor 110 of FIG. 4, so resistor 110 is eliminated in the FIG. 6 embodiment.

What is claimed is:

1. A power supply for a coating material dispenser for dispensing electrostatically charged particles of coating material, the power supply including means for generating an electrostatic charging potential, the electrostatic potential generator including a control input, means for monitoring the electrostatic potential, means for coupling the electrostatic potential monitor to the electrostatic potential generator, means for monitoring the current flow in the electrostatic potential generator, means for coupling the current-monitoring means to the electrostatic potential generator, first circuit means for generating a fold-back voltage-current characteristic, means for coupling the electrostatic potential monitor to an input of the first circuit means, the means for coupling the electrostatic potential monitor to an input of the first circuit means including means for filtering from the monitored electrostatic potential signal those frequencies above a desired cutoff frequency, means for coupling the current monitor to an input of the first circuit means, and means for coupling an output of the first circuit means to the control input of the electrostatic potential generator, the first circuit means controlling the electrostatic potential generator in such a manner as to generate a potential-current plate varying substantially along an increasing current-decreasing potential curve throughout a first region of the potential-current characteristic, and the potential and current both varying substantially continuously substantially along a decreasing current-decreasing potential curve throughout a second region of the potential-current characteristic.

2. The apparatus of claim 1 wherein the electrostatic potential generator comprises a transformer having a primary winding and a secondary winding and the means for monitoring the electrostatic potential comprises means for monitoring a potential supplied to the primary winding of the electrostatic potential generator.

3. The apparatus of claim 1 wherein the means for monitoring the electrostatic potential comprises means for monitoring the output potential supplied by the electrostatic potential generator.

4. The apparatus of claim 1 wherein the means for coupling the current monitor to an input of the first circuit means comprises means for filtering from the monitored current signal those frequencies above a desired cutoff frequency.

5. A power supply for a coating material dispenser for dispensing electrostatically charged particles of coating material, the power supply including means for generating a feed voltage, the feed voltage generator including a control input, means for generating an electrostatic charging potential, means for coupling the feed voltage generator to the electrostatic potential generator, means for monitoring the electrostatic potential, means for coupling the electrostatic potential monitor to the electrostatic potential generator, means for monitoring the current flow in the electrostatic potential generator, means for coupling the current-monitoring means to the electrostatic potential generator, first circuit means for generating a fold-back voltage-current characteristic, means for coupling the electrostatic potential monitor to an input of the first circuit means, means for coupling the current monitor to an input of the first circuit means, and means for coupling an output of the first circuit means to the control input of the feed voltage generator, means for coupling the electrostatic potential monitor to an input of the first circuit means including means for filtering from the monitored electrostatic potential signal those frequencies above a desired cutoff frequency, the first circuit means combining the signals indicative of monitored electrostatic potential and monitored current flow in such a manner as to generate a potential-current plot varying substantially along an increasing current-decreasing potential curve throughout a first region of the potential-current characteristic, and the potential and current both varying substantially continuously substantially along a decreasing current-decreasing potential curve throughout a second region of the potential-current characteristic.

6. The apparatus of claim 5 wherein the electrostatic potential generator comprises a transformer having a primary winding and a secondary winding and the means for monitoring the electrostatic potential comprises means for monitoring a potential supplied to the primary winding of the electrostatic charging potential generator.

7. The apparatus of claim 5 wherein the means for monitoring the electrostatic potential comprises means for monitoring the output potential supplied by the means for generating an electrostatic charging potential.

8. The apparatus of claim 5 wherein the means for coupling the current monitor to an input of the first circuit means comprises means for filtering from the monitored current signal those frequencies above a desired cutoff frequency.

9. A power supply for a coating material dispenser for dispensing electrostatically charged particles of coating material, the power supply including means for generating an electrostatic charging potential, the electrostatic potential generator including a control input, means for monitoring the electrostatic potential, means for coupling the electrostatic potential monitor to the electrostatic potential generator, means for monitoring the current flow in the electrostatic potential generator, means for coupling the current-monitoring means to the electrostatic potential generator, first circuit means for generating a fold-back voltage-current characteristic, means for coupling the electrostatic potential monitor to an input of the first circuit means, means for coupling the current monitor to an input of the first circuit means, the last said coupling means including means for filtering from the monitored current signal those frequencies above a desired cutoff frequency, and means for coupling an output of the first circuit means to the control input of the electrostatic potential generator, the first circuit means combining the monitored electrostatic potential signal and monitored current flow signal in such a manner as to generate a potential-current plot varying substantially along an increasing current-decreasing potential curve throughout a first region of the potential-current characteristic, and the potential and current both varying substantially continuously substantially along a decreasing current-decreasing potential curve throughout a second region of the potential-current characteristic.

10. The apparatus of claim 9 wherein the electrostatic potential generator comprises a transformer having a primary winding and a secondary winding and the menas for monitoring the electrostatic potential comprises means for monitoring a potential supplied to the primary winding of the electrostatic potential generator.

11. The apparatus of claim 9 wherein the means for monitoring the electrostatic potential comprises means for monitoring the potential supplied by the electrostatic potential generator.

12. The apparatus of claim 9 wherein the means for coupling the electrostatic potential monitor to an input of the first circuit means comprises means for filtering from the monitored electrostatic potential signal those frequencies above a desired cutoff frequency.

13. A power supply for a coating material dispenser for dispensing electrostatically charged particles of coating material, the power supply including means for generating a feed voltage, the feed voltage generator including a control input, means for generating an electrostatic charging potential, means for coupling the feed voltage generator to the electrostatic potential generator, means for monitoring the electrostatic potential, means for coupling the electrostatic potential monitor to the electrostatic potential generator, means for monitoring the current flow in the electrostatic potential generator, means for coupling the current-monitoring means to the electrostatic potential generator, first circuit means for generating a fold-back voltage-current characteristic, means for coupling the electrostatic potential monitor to an input of the first circuit means, means for coupling the current monitor to an input of the first circuit means, the last said coupling means including means for filtering from the monitored current signal those frequencies above a desired cutoff frequency, and means for coupling an output of the first circuit means to the control input of the feed voltage generator, the first circuit means combining the signals indicative of monitored electrostatic potential and monitored current flow in such a manner as to generate a potential-current plot varying substantially along an increasing current-decreasing potential curve throughout a first region of the potential-current characteristic, and the potential and current both varying substantially continuously substantially along a decreasing current-decreasing potential curve throughout a second region of the potential-current characteristic.

14. The apparatus of claim 13 wherein the electrostatic potential generator includes a transformer having a primary winding and a secondary winding and the means for monitoring the electrostatic potential comprises means for monitoring a potential supplied to the primary winding of the electrostatic potential generator.

15. The apparatus of claim 13 wherein the means for monitoring the electrostatic potential comprises means for monitoring the potential supplied by the electrostatic potential generator.

16. The apparatus of claim 13 wherein the means for coupling the electrostatic potential monitor to an input of the first circuit means comprises means for filtering from the monitored electrostatic potential signal those frequencies above a desired cutoff frequency.

* * * * *

UNITED STATES PATENT AND TRADEMARK OFFICE
CERTIFICATE OF CORRECTION

PATENT NO. : 4,485,427
DATED : November 27, 1984
INVENTOR(S) : Frederick W. Woodruff and Daniel C. Hughey It is certified that error appears in the above-identified patent and that said Letters Patent is hereby corrected as shown below:

At column 7, line 10, between "the" and "input", insert --+--.

At column 9, line 5, delete "plate" and insert --plot-- therefor.

At column 10, line 44, delete "menas" and insert --means-- therefor.

Signed and Sealed this

Twenty-first Day of May 1985

[SEAL]

Attest:

DONALD J. QUIGG

Attesting Officer     Acting Commissioner of Patents and Trademarks